United States Patent [19]
Peters

[11] 3,889,922
[45] June 17, 1975

[54] VALVE AND ACTUATOR ASSEMBLY

[75] Inventor: Clifford M. Peters, Longview, Tex.

[73] Assignee: ACF Industries, Incorporated, New York, N.Y.

[22] Filed: Dec. 13, 1973

[21] Appl. No.: 424,616

Related U.S. Application Data

[63] Continuation-in-part of Ser. No. 373,139, June 25, 1973, abandoned, which is a continuation-in-part of Ser. No. 171,097, Aug. 12, 1971, abandoned.

[52] U.S. Cl. .................. 251/14; 251/63.6; 137/553
[51] Int. Cl. ....................... F16k 31/14; F16k 31/44
[58] Field of Search............ 91/1 R; 92/5 R; 251/14, 251/62, 63.4, 63.5, 63.6, 282; 137/413, 553

[56] References Cited
UNITED STATES PATENTS

| | | | |
|---|---|---|---|
| 2,431,283 | 11/1947 | Spence................................. | 251/14 |
| 2,564,569 | 8/1951 | Goehring .......................... | 92/5 R X |
| 2,890,014 | 6/1959 | Luoma et al........................... | 251/14 |
| 3,385,561 | 5/1968 | Whalen.............................. | 251/14 X |
| 3,402,912 | 9/1968 | Watkins................................ | 251/14 |
| 3,414,693 | 12/1963 | Watson et al..................... | 92/5 R X |

*Primary Examiner*—Henry T. Klinksiek
*Attorney, Agent, or Firm*—Jack W. Hayden

[57] ABSTRACT

A valve body is provided with a transverse bore for fluid flow therethrough with a lateral bore intersecting the transverse bore for receiving a valve element therein for opening and closing the transverse bore. The valve element has a stem connected thereto that is connected to a valve operator supported on the valve body which valve operator positions the valve member or element to open or close the transverse bore in the valve body and thus control flow through the valve.

First seal means are mounted in the lateral bore to close off one end thereof and for sealably engaging the valve stem. Second seal means mounted in the lateral bore sealably engage the valve stem and are exposed to fluid from the transverse bore so that a predetermined force is exerted to move the element as it moves to close the valve.

Third seal means are mounted on the valve stem which sealably and slidably engages the lateral bore and the cross-sectional area of the valve stem and third seal means is larger than the cross-sectional area of the valve stem where it sealably engages the second seal means.

Fluid passage means in the valve stem receives fluid from the transverse bore on the upstream side of the element and discharges it between the first seal means and third seal means to aid in moving the element when opening the valve.

A shaft is threadedly supported in the valve housing and upon rotation it engages the piston to move the valve operator so as to position the valve member within the valve body for flow therethrough; thereafter the threaded shaft may be backed off from the piston.

Plunger means are mounted in the housing and is urged exteriorly thereof when the valve element is in a position so that flow may be conducted through the valve body so as to indicate the position of the valve member or element within the body.

7 Claims, 2 Drawing Figures

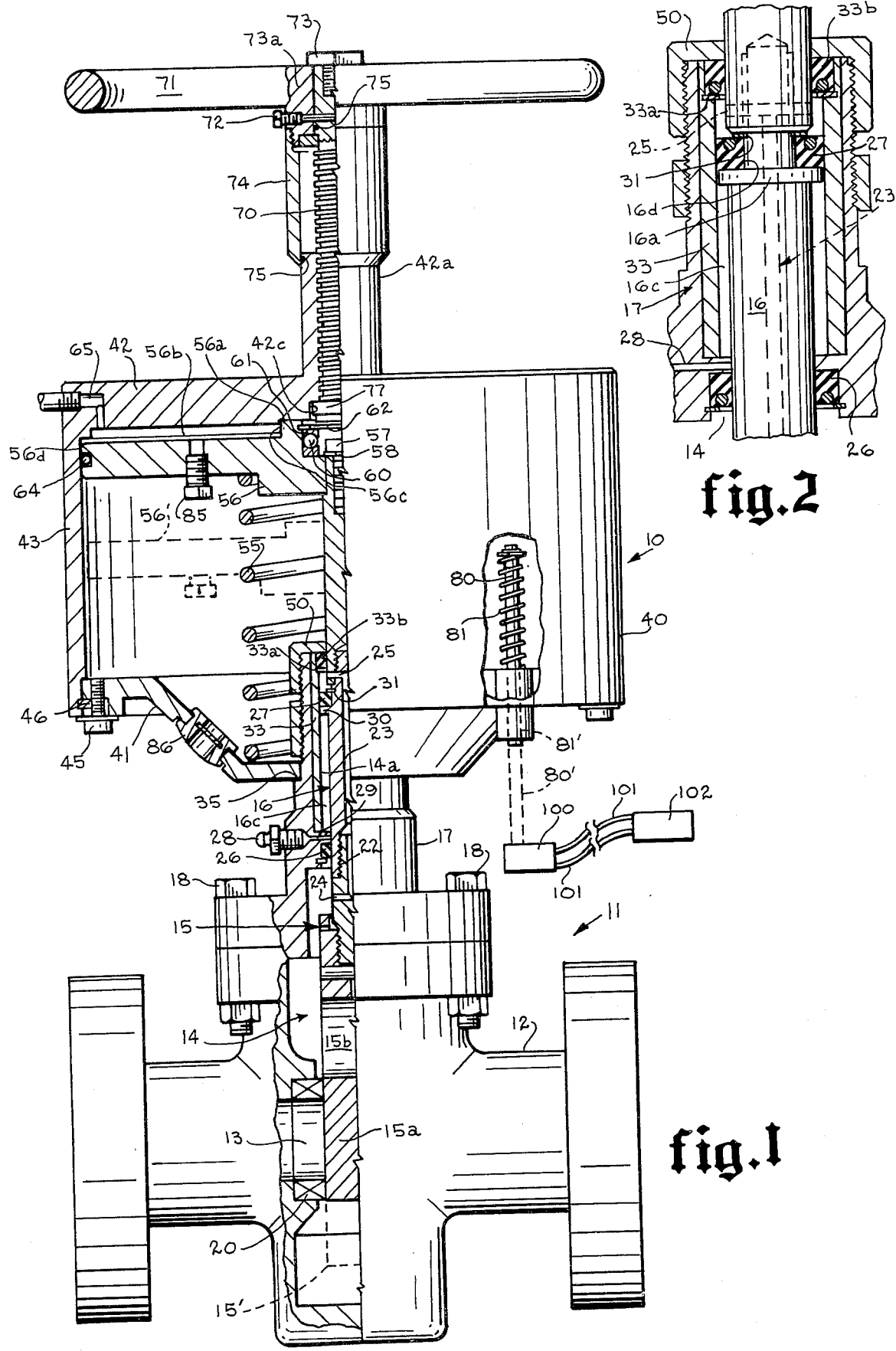

VALVE AND ACTUATOR ASSEMBLY

CROSS REFERENCE TO RELATED APPLICATION

This application is a continuation-in-part of my prior copending application Ser. No. 373,139 filed June 25, 1973 for "Arrangement for Controlling the Effect of Trapped Pressure in a Valve and Operator Therefor" now abandoned which in turn is a continuation-in-part of prior copending application Ser. No. 171,097 filed Aug. 12, 1971, now abandoned.

BACKGROUND OF THE INVENTION

The prior art with which applicant is familiar is: Norman Nelson U.S. Pat. No. 3,765,642; P. Spence U.S. Pat. No. 2,431,283; and C. M. Peters et al. U.S. Pat. No. 2,897,836.

In applicant's opinion, the closest of the above appears to be Nelson U.S. Pat. No. 3,765,642; however, it fails to provide a construction having the structure and resulting functional advantages of the present invention as will be noted in detail herein.

In valve constructions of the prior art with which applicant is familiar and which employ an operator for moving the valve member towards open position, some difficulty may be encountered in trying to open the valve after it has been closed. In addition to the pressure within the valve which may tend to retain the valve in closed position and may act to retard opening the valve, further complications may be encountered when the valve has been in closed position over a sufficient period of time so that the valve member tends to become frozen or secured in closed position.

Valve operators which are arranged for automatic control of the valve to maintain the valve in an open position, and for automatic closing of the valve upon a predetermined occurrence in a safety system, include a housing and a piston, there being a shaft secured to the piston and extending outwardly through the housing, with the valve member connected to the other side of the piston. This shaft is normally adapted to receive an arrangement on the upper end thereof to aid in moving the valve member from closed to open position within the valve body. Thereafter, such arrangement must be removed from the shaft so that the valve operator can function in a normal manner to automatically control the valve.

It can be appreciated that in some situations the pressure within the valve body tending to urge the valve member towards a seated or closed position may reach substantial pressures, so that when the valve member is moved towards closed position by the valve operator, such pressure may tend to retain the closure element in seated position and this force must be overcome before the valve member can be repositioned within the valve for flow therethrough. In some situations it is extremely difficult to open the valve.

In other situations, it can be appreciated that the necessity of providing a special arrangement for fitting with the end of the shaft connected to the piston in the valve operator is cumbersome and timing consuming, as well as requiring special tools for manipulating the valve operator and valve associated therewith.

SUMMARY OF THE INVENTION

Industry, at the present time and for many years past, so far as known to applicant, has considered it necessary or desirable to utilize a valve stem having a minimum O.D. of 1 ¼ inches where a valve is employed with an actuator.

The present invention is directed to a valve and valve operator or actuator wherein the pressure within the valve body is utilized to exert a predetermined minimum force to aid in closing the valve when the actuator moves the valve member to closed position and wherein the pressure in the valve body is also utilized to thereafter aid in urging the valve member to open position when it is desired to do so.

The valve operator or actuator is constructed and arranged so that when it is necessary to manually open the valve, no special tools or attachments are required, and after the piston in the valve operator or actuator and connected valve member have been moved to a position for accommodating flow through the valve body, the portion of the valve actuator employed to accomplish such function may be retracted to a position on the valve actuator housing so as to not interfere with normal automatic control of the valve by the valve actuator, while retaining it in position on the valve actuator housing for its use when next required.

An object of the present invention is to provide an arrangement in a valve for controlling the effect of pressure within the valve body in a desired manner to aid in closing and opening the valve when desired.

Another object of the present invention is to provide a valve and valve actuator therefore which is relatively simple in construction but which reduces, if not completely eliminates the effect of pressure within the valve body that may tend to act against the valve member as it is moved from closed towards open position, and which utilizes such pressure to aid in reopening the valve.

Yet a further object of the present invention is to provide a valve for use with a valve actuator wherein the valve is provided with fluid passage means in the valve stem so that pressure within the valve body when the valve is closed may be conducted therethrough. Spaced seal means are provided between the valve stem and valve body so that the pressure conducted through the passage and the stem acts on the effective seal areas and thereby reduces, if not substantially eliminates any effect that the pressure within the valve body may have tending to prevent opening of the valve member and thus aids in moving the valve member towards open position. The passage means is arranged in the valve in a manner to utilize the pressure of fluid flowing through the valve to accomplish desired results, but which inhibits loss of fluid flowing through the valve to atmosphere.

Still another object of the present invention is to provide a valve actuator for use with a valve including a housing, a piston therein secured to a valve member mounted in the valve body, and a shaft threadedly positioned in the valve actuator housing with means thereon for rotation of the shaft to move it against the piston and urge the valve member towards open position within the valve body.

Still another object of the present invention is to provide a valve actuator for use with a valve including a housing, a piston therein secured to a valve member mounted in the valve body, a shaft threadedly positioned in the valve actuator housing with means thereon for rotation of the shaft to move it against the piston and urge the valve member towards open position within the valve body, and means for indicating the position of the valve member within the valve body.

Yet a further object of the present invention is to provide a seal arrangement in a valve to obtain a desired effect of the pressure in the valve body acting on the valve member when the valve member is in closed position to aid in opening the valve, as well as utilizing the pressure in the valve body to exert a predetermined force to aid in closing the valve.

Still a further object of the present invention is to provide a valve and valve actuator associated therewith which does not require any special attachments for actuation of the valve actuator manually.

Still a further object of the present invention is to provide a valve and valve actuator associated therewith which does not require any special attachments for actuation of the valve actuator manually but which includes an arrangement that is retained in position on the valve actuator housing for use in instances where it is necessary to manually activate the valve actuator to move the valve member toward open position in the valve.

BRIEF DESCRIPTION OF THE DRAWING

FIG. 1 is a quarter sectional view of the preferred embodiment; and

FIG. 2 is a fragmentary, sectional enlargement of a portion of the valve body, valve stem and seal means arrangement of the present invention.

DESCRIPTION OF THE PREFERRED EMBODIMENTS

The present invention is shown in the drawing in its configuration for use on a gate valve, and the description is directed toward such showing. However, this is intended only for purposes of illustration as the invention may be employed on other valve constructions.

In the drawing, the valve actuator is represented at 10 and is constructed and arranged to be mounted on the gate valve 11.

The valve 11 includes a body 12 having a transverse bore 13 therethrough for bi-directional flow through the valve body if desired. A lateral bore indicated generally at 14 is provided in the valve body and intersects the transverse bore as illustrated. A valve closure element comprising the valve member 15 and valve stem 16 connected therewith is positioned within the lateral bore 14. The valve body 12 includes the valve bonnet 17 secured thereto by a suitable means such as the flange bolt and nut arrangement 18.

At the intersection of the transverse bore 13 and the lateral bore 14 suitable packing means as illustrated at 20 are provided for sealably engaging with the valve member 15. It will be noted that the valve member 15 is in a form of a gate which includes the solid portion 15a which, when positioned as shown in the figure closes off flow through the valve body, and also includes the opening 15b which accommodates flow through the valve body 12 when the member 15 is moved to align opening 15b with transverse bore 13. The valve stem 16 may be secured to the valve member 15 by any suitable means and is illustrated as being secured by threads on the valve member and on the valve stem at 22 at the upper end of the valve member 15.

Passage means 23 are provided in the valve stem with its ends at 24 and 25 being spaced and extending into or communicating with the lateral bore 14 of the valve body 12. Suitable seal means at 26 and 27, which may be designated for reference purposes as second seal means and third seal means respectively, are spaced within the lateral bore 14 between the valve stem 16 and valve body 12 and as shown in this form of the invention are positioned between the ends 24, 25 of the fluid passage 23 in the valve stem 15.

Pressure which may be present within the lateral bore 14 of valve body 12 when the valve member is moved towards closed position in prior art constructions may tend to urge or retain the valve member in closed position.

However, the construction of the present invention as shown in the drawings causes the pressure which is conducted through the passage means 23 to act above the third packing means 27 and below second packing means 26, and against first seal means 33b to aid in closing the valve member when it is moved towards the closed position and to aid in moving it is opened. Such pressure is not sufficient to overcome spring 55 and the valve member 15 will not be moved to open position until the valve actuator 10 causes such action, or until it is manually opened by handwheel 71.

For example, assume a pressure of 5,000 p.s.i. on the upstream side of valve member 15 in bore 13; assume that the cross sectional area of stem 16 at seal 26 is 2.0739 square inches, and assume that the cross sectional area across the stem 16 and seal 27 is 2.76 square inches. The outer diameter of stem 16 at seal 33b is the same as the diameter of stem 16 at seal 26 and therefore the effective area of seal 27 responsive to pressure from passage 23 is 0.69 square inches. These assumed cross sectional areas apply when the stem 16 is 1 5/8 inches outer diameter at seal 26 and at seal 33b and the outer diameter of seal 27 is 1 7/8 inches.

By multiplying 2.074 times 5,000, the force tending to urge stem 16 and valve member 15 up is determined, which is approximately 10,370 pounds. Similarly, by multiplying 0.69 times 5,000, the effective down force at seal 27 is determined, which is approximately 3,450 pounds. By subtracting 3450 from 10,370, the total up force acting to tend to close the valve under the assumed conditions is approximately 6,920 pounds.

The stem 16 presently employed in industry with a valve actuator is 1 1/4 inches outer diameter and its cross sectional area is approximately 1.22 square inches and this multiplied by 5,000 is the force tending to close the valve which is approximately 6,100 pounds.

By subtracting 6100 pounds from 6920 pounds, it is seen that the larger size valve stem, seal arrangement and passage means 23 of the present invention 820 pounds more force to aid in closing the valve when desired, in the example given as related to a 1 5/8 outer diameter valve stem over and above that available when a 1 1/4 outer diameter valve stem is employed without the passage means 23 and seal arrangement of the present invention. Also the arrangement of the present invention provides a predetermined minimum force of 3450 pounds force to aid in opening the valve after it has been closed.

In FIG. 2, the third seal means 27 is shown in greater detail as being seated on the flange 16a adjacent the reduced cross sectional area 16b formed on the stem between third seal means 27 and first seal means 33b. The flange 16a is of larger radial extent than the diameter of the stem 16, and thus there is an annular clearance 16c between valve stem 16 and inner wall 14a of cylindrical member 33, as shown more clearly in FIG. 2.

A suitable grease fitting 28 is communicated by the passage 29 to the lateral bore 14 for injecting grease or other fluid medium in the space 16c between the spaced seal means 26 and 27, if desired, and also serves as a vent to vent space 16c to atmosphere to prevent locking the valve stem 16 against reciprocal movement.

As shown, the seal means 27 is carried on the flange 30 formed on the valve stem 16 adjacent, but spaced from the end 25 of the passage 23 for receiving the seal means 27 thereon. A snap ring 31, or other suitable means may be employed to retain the seal 27 in position on the stem 16.

The seal 26 is illustrated as being positioned in the valve body, in a manner as shown, and thus it can be seen that the seal 27 travels with the valve stem 16 within the lateral bore 14. If desired a suitable cylindrical member 33 may be provided within the lateral bore 14 against which the outer circumferential edge of the seal 27 sealably engages.

As shown in the drawing and as described above, the pressure in bore 14 from bore 13 is used in cooperation with the seal arrangement and valve stem to exert a predetermined minimum force to aid in moving the valve member 15 towards closed position. After the valve member 15 has closed and when it is thereafter desired to move the valve member 15 towards open position the arrangement of the present invention provides a force to aid in opening the valve. Pressure from bore 13 is conducted through passage 23 in stem 16 to act on the effective cross sectional area of stem 16 at seal 26 and to act on the effective area of seal 27. The pressure effective from bore 14 tending to urge the valve member 15 towards open position is the pressure in bore 14 acting downwardly on the effective area of seal 27, less the pressure in bore 14 acting on the effective cross sectional area of stem 16 at seal 26. The term "effective area" as used herein is well understood by those skilled in the art and explanation thereof is deemed unnecessary.

At any event, there is an effective differential area, as illustrated in the drawing against which pressure from passage means 23 acts to exert a force to aid in moving the valve member 15 towards open position, but the construction and arrangement also provides a minimum predetermined force available to aid in closing the valve member 15 when desired, as disclosed and described herein.

A shoulder 35 is provided on the valve body 12 on which the valve operator 10 is seated. The valve operator 10 includes a cylindrical housing 40 formed of the end members 41 and 42 which are connected together by the cylindrical side 43. The housing 10 may be constructed in any suitable manner and as illustrated it will be noted that the end wall 42 and cylindrical side wall 43 are shown as being integral, while the end wall 41 is separate and adapted to be connected to cylindrical wall 43 by a split lock ring 46 fitting as shown and bolts 45 to retain the ring in position.

After the end wall 41 of the valve operator housing 40 has been seated on the shoulder 35 of valve body 12, the cap 50 may be threadedly engaged with the top of the bonnet 17 in the manner as illustrated. It will be noted that the upper end of the cylinder 33 is provided with a shoulder 33a for receiving a support and lock ring thereon for the seal 33b which inhibits flow of fluid from the lateral bore 14 into the interior of the valve operator housing 40.

Thereafter the spring 55 is positioned about the valve stem 16 and the piston 56 secured in position on the shoulder adjacent the upper end of the valve stem by any suitable means such as the bolt 57 and washer 58. The bolt 57 and the washer 58 are arranged in the counter bore 60 of the piston and within the counter bore 60 there is provided a roller bearing arrangement 61 secured in position by the lock ring 62. The bore 60 extends from the end 56a of the piston, and it will be noted that the portion 56b of the piston is recessed relative to the central portion which surrounds bore 60 as shown to form an annular raised shoulder 56c. This also forms a space between the end 42 and piston 56. The circumferential edge 56d of the piston is provided with suitable seal means 64 for sealably engaging with the interior of the cylindrical wall 43 of the valve operator housing 40.

Suitable means such as the passage 65 are provided through the valve operator housing 40 for the passage of fluid into the interior of the valve operator to operate the valve in a manner well known in the art. It will be noted that the spring tends to urge or move the piston 56 upwardly in housing 40 and this urges valve member 15 towards closed position in the valve body 12. Therefore, should some failure occur in the fluid supply system (which supplies fluid through 65 to force piston 56 downwardly to open the valve) or should some occurrence within the system in which the valve is used indicate to the fluid supply through passage 65 that the valve should be closed, the fluid supply may be shut off whereupon the spring 55 will move the valve member 15 towards closed position as shown on the drawings. The manner in which fluid to passage 65 is shut off and vented so that the spring 55 moves the valve member is well known and forms no part of the present invention.

The end 42 of the valve operator housing 40 includes the upwardly extending projection 42a which is threaded as shown for receiving the shaft 70. A hand wheel 71 is secured to the upper end of the shaft by the shear pin 72 and bolt 73. The hand wheel includes a threaded hub 73a secured to the sleeve 74 which telescopically surrounds the upwardly extending projection 42a. Suitable seal means 75 are provided between the bore in the hub 73a and shaft 70 and between the sleeve 74 and upwardly extending projection 42a to inhibit fluid leakage from the interior of the valve operator housing.

The lower end of the shaft 70 terminates in the annular enlargement 77 received within the counterbore 42c of the end wall 42 when the shaft is retracted from the housing 40 and in elevated position as illustrated in the drawing. When the hand wheel 71 is rotated clockwise the shaft 70 moves downwardly into the valve operator housing 40 and the enlargement 77 abuts the upper part of the bearing race 61 so that continued rotation of the shaft 70 by the hand wheel 71 rotates the upper half of the bearing race as the piston 56 is forced downwardly against the spring 55 by the downward movement of shaft 70 within the housing. When the piston is moved to the dotted line position illustrated at 56', then the valve member 15 will be lowered within the valve body 12 so as to align the opening 15b with the transverse bore 13 and its lower end will assume the position represented by the dotted line 15'.

As the piston 56 moves down, it will engage the plunger 80 which is supported in the opening 81' extending through the lower end wall 41 of the housing 40. The plunger 80 is maintained in its elevated position as shown in full line view of the drawing by the spring 81, and will be urged to the dotted line position represented at 80' when the piston is in the position represented at 56'. This serves as an indicator for a visual indication of the condition of the valve, regardless of the position of the shaft 70. A microswitch or other suitable electromechanical arrangement is illustrated diagrammatically at 100 and suitable electrical conduits 101 are connected to an alarm represented schematically at 102 which may be remotely located, if desired. The alarm indicates that the valve 11 has closed, thus indicating some abnormal condition in the system and also indicating that the valve 11 must be attended to. Such type indication is particularly important in offshore applications or in other remote areas.

After the hand wheel 71 and shaft 70 have been actuated to move the piston 56 downwardly, fluid may be supplied through the line 65 and automatic control of the valve may then be continued, in a manner well known in the art. The shaft 70 may be rotated by moving the handle 71 in a counterclockwise direction so that it is retracted to its position so as to not interfere with normal automatic operation of the valve.

Should the pressure in the housing 40 acting on the piston 56 become excessive a safety blowout plug 85 is provided, and similarly should a leak occur because of the failure of seal 33b between the valve body and the housing 40, the safety blowout plug 86 will indicate such fact.

From the foregoing it can be seen that the arrangement of the seals and construction of the present invention utilizes the pressure in bore 13 to provide a predetermined minimum force to aid in closing valve member 15 and to provide a force which is employed to aid in urging the valve member 15 towards open position when it is desired to open the valve. This tends to inhibit sticking or freezing of the valve member 15 in closed position.

Since the shaft 70 is disconnected from the piston 56, it must be rotated to engage the piston and move it downwardly within the housing. Thereafter it may be retracted, and this construction does not require any special attachment for the shaft 70, nor does it require that the shaft 70 be connected to the upper end of the piston 56.

In some valve constructions, there are seal means 20 on only the downstream side of valve member 15 as shown in the drawing, and in other valve constructions there are seal means on both the upstream and downstream side of the valve member 15 in bore 13. Also, the form of the gate or valve member may assume a configuration other than that shown. In these events, the passage means 23 would be modified accordingly to assure that the pressure in the bore 13 upstream of valve member 15 when in closed position will be effective through the passage means 23 to aid in moving the valve member towards open position, as described herein.

The passage means 23 is preferably formed in the body in a manner so that any high pressure fluid flow through passage 13 will not act on valve components that might not be able to withstand the pressure.

The foregoing disclosure and description of the invention are illustrative and explanatory thereof, and various changes in the size, shape, and materials as well as in the details of the illustrated construction may be made without departing from the spirit of the invention.

What is claimed is:

1. In a valve including a body having a transverse bore for fluid flow therethrough and having a lateral bore intersecting the transverse bore for receiving therein an element for closing and opening the transverse bore to fluid flow and a movable valve stem in the body connected to move the element in the transverse bore for opening and closing the valve, the improvement comprising:
   a. first seal means mounted in the lateral bore to close off one end thereof and sealably engaging the valve stem;
   b. second seal means mounted in the lateral bore in spaced relation to said first seal means to close off the other end thereof and sealably engaging the valve stem and being exposed to fluid from the transverse bore whereby a predetermined minimum force is exerted on the valve stem by the fluid in the transverse bore to aid in moving the element when closing the valve;
   c. third seal means mounted on the valve stem between said first and second seal means for sealably and slidably engaging the lateral bore, the cross sectional area of the valve stem and said third seal means being larger than the cross sectional area of the valve stem where it sealably engages said second seal means; and
   d. therebeing fluid passage means in the valve stem for receiving fluid pressure from the transverse bore on the upstream side of the element and discharging the fluid pressure to the lateral bore between said first and third seal means to act on said third seal means and aid in moving the element when opening the valve.

2. The invention of claim 1 including passage means in said body between said second and third seal means for venting the lateral bore therebetween to atmosphere for accommodating movement of said third seal means and valve stem.

3. The invention of claim 1 including:
   a. a valve actuator housing carried by the valve body and including end members connected by a cylindrical side;
   b. piston means secured to the valve stem and sealably engaging said cylindrical side of said valve actuator housing;
   c. spring means normally urging said piston means and connected valve stem to position the element for closing off flow through the transverse bore; and
   d. a shaft threadedly positioned in said valve actuator housing for engaging said piston upon rotation of said shaft to thereby move said piston against said spring means and move the element to open the valve.

4. The invention of claim 3 including passage means in said valve actuator housing for conducting fluid thereinto to act on said piston means to urge said piston means against said spring means to move the element to open the valve.

5. The invention of claim 3 including means to rotate said shaft means.

6. The invention of claim 1 including spring supported plunger means mounted on one of said end members and extending into said valve actuator housing, whereby when said piston means is urged longitudinally of said valve actuator housing said plunger means is engaged by said piston means and is moved out of said housing as an indication of the position of the element in the valve body.

7. The invention of claim 6 including means for instrumentally noting movement of said plunger means.

* * * * *